United States Patent
Stamires et al.

(10) Patent No.: US 9,643,166 B2
(45) Date of Patent: *May 9, 2017

(54) FCC CATALYST, ITS PREPARATION AND USE

(75) Inventors: Dennis Stamires, Dana Point, CA (US); Paul O'Connor, Hoevelaken (NL); Erik Jeroen Laheij, Amstelveen (NL); Charles Vadovic, Houston, TX (US)

(73) Assignee: Albemarle Netherlands B.V. (NL)

( * ) Notice: Subject to any disclaimer, the term of this patent is extended or adjusted under 35 U.S.C. 154(b) by 2288 days.

This patent is subject to a terminal disclaimer.

(21) Appl. No.: 11/722,388

(22) PCT Filed: Dec. 20, 2005

(86) PCT No.: PCT/EP2005/056983
§ 371 (c)(1),
(2), (4) Date: Nov. 9, 2009

(87) PCT Pub. No.: WO2006/067154
PCT Pub. Date: Jun. 29, 2006

(65) Prior Publication Data
US 2010/0152024 A1    Jun. 17, 2010

Related U.S. Application Data

(60) Provisional application No. 60/637,457, filed on Dec. 21, 2004.

(30) Foreign Application Priority Data

Mar. 9, 2005  (EP) ..................... 05075577

(51) Int. Cl.
| | | |
|---|---|---|
| *B01J 29/08* | (2006.01) |
| *B01D 53/94* | (2006.01) |
| *B01J 29/06* | (2006.01) |
| *B01J 37/00* | (2006.01) |
| *C01B 3/02* | (2006.01) |
| *C10G 1/08* | (2006.01) |
| *C10G 2/00* | (2006.01) |
| *C10G 11/05* | (2006.01) |
| *C10G 29/20* | (2006.01) |
| *C10G 35/06* | (2006.01) |
| *C10G 49/08* | (2006.01) |
| *B01J 35/00* | (2006.01) |

(52) U.S. Cl.
CPC ............ *B01J 29/084* (2013.01); *B01D 53/94* (2013.01); *B01J 29/06* (2013.01); *B01J 37/0045* (2013.01); *C01B 3/02* (2013.01); *C10G 1/086* (2013.01); *C10G 2/33* (2013.01); *C10G 11/05* (2013.01); *C10G 29/205* (2013.01); *C10G 35/06* (2013.01); *C10G 49/08* (2013.01); *B01J 35/002* (2013.01); *B01J 2229/42* (2013.01); *C01B 2203/1041* (2013.01)

(58) Field of Classification Search
None
See application file for complete search history.

(56) References Cited

U.S. PATENT DOCUMENTS

| | | | |
|---|---|---|---|
| 3,890,247 A * | 6/1975 | Young ........................ 502/66 |
| 5,194,243 A | 3/1993 | Pearson et al. |
| 6,080,303 A * | 6/2000 | Cao et al. ............... 208/120.01 |
| 6,541,409 B1 * | 4/2003 | Jones et al. .................... 502/84 |
| 6,555,496 B1 * | 4/2003 | Stamires et al. ............. 502/327 |
| 7,026,266 B2 * | 4/2006 | Chaudhari et al. .......... 502/155 |
| 2002/0185412 A1* | 12/2002 | Cheng et al. ............ 208/120.01 |
| 2003/0003035 A1* | 1/2003 | Stamires et al. ............. 422/225 |

FOREIGN PATENT DOCUMENTS

| | | | |
|---|---|---|---|
| CN | 1119390 | * | 8/2003 |
| EP | 1 264 635 A1 | | 12/2002 |
| GB | 1422451 | * | 1/1973 |
| GB | 142245 A | | 1/1976 |

* cited by examiner

*Primary Examiner* — Melvin C Mayes
*Assistant Examiner* — Sheng H Davis
(74) *Attorney, Agent, or Firm* — Nathan C. Dunn; James A. Jubinsky; Marcy M. Hoefling

(57) ABSTRACT

A process for preparing a catalyst is disclosed. The process generally comprises the steps of: (a) preparing a slurry comprising clay, zeolite, a sodium-free silica source, quasi-crystalline boehmite, and micro-crystalline boehmite, provided that the slurry does not comprise peptized quasi-crystalline boehmite; (b) adding a monovalent acid to the slurry; (c) adjusting the pH of the slurry to a value above about 3, and (d) shaping the slurry to form particles. This process results in attrition resistant catalysts with a good accessibility.

7 Claims, No Drawings

FCC CATALYST, ITS PREPARATION AND USE

This application is a U.S. 371 of International Application No. EP2015/0569863, filed Dec. 20, 2005, which claims the priority of U.S. Provisional Application No. 60/637,457, filed Dec. 21, 2004 and EP Application No. 050755776, filed Mar. 9, 2005, the contents of which are incorporated herein in their entirety.

The present invention relates to a process for the preparation of a catalyst, catalysts obtainable by this process, and their use in, e.g., fluid catalytic cracking (FCC).

A common challenge in the design and production of heterogeneous catalysts is to find a good compromise between the effectiveness and/or accessibility of the active sites and the effectiveness of the immobilising matrix in giving the catalyst particles sufficient physical strength, i.e. attrition resistance.

The preparation of attrition resistant catalysts is disclosed in several prior art documents.

U.S. Pat. No. 4,086,187 discloses a process for the preparation of an attrition resistant catalyst by spray-drying an aqueous slurry prepared by mixing (i) a faujasite zeolite with a sodium content of less than 5 wt % with (ii) kaolin, (iii) peptised pseudoboehmite, and (iv) ammonium polysilicate.

The attrition resistant catalysts according to U.S. Pat. No. 4,206,085 are prepared by spray-drying a slurry prepared by mixing two types of acidified pseudoboehmite, zeolite, alumina, clay, and either ammonium polysilicate or silica sol.

GB 1 315 553 discloses the preparation of an attrition resistant hydrocarbon conversion catalyst comprising a zeolite, a clay, and an alumina binder. The catalyst is prepared by first dry mixing the zeolite and the clay, followed by adding an alumina sol. The resulting mixture is then mixed to a plastic consistency, which requires about 20 minutes of mixing time. In order to form shaped particles, the plastic consistency is either pelletised or extruded, or it is mixed with water and subsequently spray-dried.

The alumina sol disclosed in this British patent specification comprises aluminium hydroxide and aluminium trichloride in a molar ratio of 4.5 to 7.0 (also called aluminium chlorohydrol).

U.S. Pat. No. 4,458,023 relates to a similar preparation procedure, which is followed by calcination of the spray-dried particles. During calcination, the aluminium chlorohydrol component is converted into an alumina binder.

WO 96/09890 discloses a process for the preparation of attrition resistant fluid catalytic cracking catalysts. This process involves the mixing of an aluminium sulphate/silica sol, a clay slurry, a zeolite slurry, and an alumina slurry, followed by spray-drying. During this process, an acid- or alkaline-stable surfactant is added to the silica sol, the clay slurry, the zeolite slurry, the alumina slurry and/or the spray-drying slurry.

CN 1247885 also relates to the preparation of a spray-dried cracking catalyst. This preparation uses a slurry comprising an aluminous sol, pseudoboehmite, a molecular sieve, clay, and an inorganic acid. In this process the aluminous sol is added to the slurry before the clay and the inorganic acid are added, and the molecular sieve slurry is added after the inorganic acid has been added. According to one embodiment, pseudoboehmite and aluminium sol are first mixed, followed by addition of the inorganic acid. After acidification, the molecular sieve is added, followed by kaolin.

WO 02/098563 discloses a process for the preparation of an FCC catalyst having both a high attrition resistance and a high accessibility. The catalyst is prepared by slurrying zeolite, clay, and boehmite, feeding the slurry to a shaping apparatus, and shaping the mixture to form particles, characterised in that just before the shaping step the mixture is destabilised. This destabilisation is achieved by, e.g., temperature increase, pH increase, pH decrease, or addition of gel-inducing agents such as salts, phosphates, sulphates, and (partially) gelled silica. Before destabilisation, any peptisable compounds present in the slurry must have been well peptised.

Although the catalyst according to the latter document has a relatively high attrition resistance and accessibility, it has now been found that the accessibility/attrition resistance ratio can be further improved.

This further improvement is achieved by the process according to the invention, which process comprises the steps of:

a) preparing a slurry comprising clay, zeolite, a sodium-free silica source, quasi-crystalline boehmite, and micro-crystalline boehmite, provided that the slurry does not comprise peptised quasi-crystalline boehmite,
b) adding a monovalent acid to the slurry,
c) adjusting the pH of the slurry to a value above 3, and
d) shaping the slurry to form particles, In contrast to conventional processes where quasi-crystalline boehmites (e.g. pseudoboehmites) always have been peptised before addition to the zeolite-containing slurry, the process according to the invention adds non-peptised quasi-crystalline boehmite (QCB). Acid is only added after QCB addition, i.e. to a slurry that also comprises zeolite and clay.

Further, a sodium-free silica source is used. Examples of sodium-free silica sources are (poly)silicic acid, sodium-free silica sol, potassium silicate, lithium silicate, calcium silicate, magnesium silicate, barium silicate, strontium silicate, zinc silicate, phosphorus silicate, and borium silicate. Examples of suitable organic silicates are silicones (polyorganosiloxanes such as polymethylphenylsiloxane and polydimethylsiloxane) and other compounds containing Si—O—C—O—Si structures, and precursors thereof such as methyl chlorosilane, dimethyl chlorosilane, trimethyl chlorosilane, and mixtures thereof.

Preferred sodium-free silica sources are (poly)silicic acid and sodium-free silica sol.

Further, the process according to the present invention leads to the preparation of catalysts comprising both micro- and quasi-crystalline boehmites with an attrition resistance that is sufficient for use in FCC.

Micro-crystalline boehmite (MCB) is a suitable metal passivator, in particular for Ni contaminants. However, up to now the preparation of MCB-containing FCC catalyst particles has been unsuccessful, because MCB is difficult to bind with conventional FCC-type binders, leading to catalyst particles with unacceptable attrition. With the process according to the present invention, MCB-containing catalysts with satisfactory attrition resistance are obtained.

Boehmite

The term "boehmite" is used in the industry to describe alumina hydrates which exhibit X-ray diffraction (XRD) patterns close to that of aluminium oxide-hydroxide [AlO(OH)]. Further, the term boehmite is generally used to describe a wide range of alumina hydrates which contain different amounts of water of hydration, have different surface areas, pore volumes, specific densities, and exhibit different thermal characteristics upon thermal treatment. Yet their XRD patterns, although they exhibit the characteristic boehmite [AlO(OH)] peaks, usually vary in their widths and can also shift in their location. The sharpness of the XRD peaks and their location has been used to indicate the degree of crystallinity, crystal size, and amount of imperfections.

Broadly, there are two categories of boehmite aluminas: quasi-crystalline boehmites (QCBs) and micro-crystalline boehmites (MCBs).

In the state of the art, quasi-crystalline boehmites are also referred to as pseudoboehmites and gelatinous boehmites. Usually, these QCBs have higher surface areas, larger pores and pore volumes, and lower specific densities than MCBs. They disperse easily in water or acids, have smaller crystal sizes than MCBs, and contain a larger number of water molecules of hydration. The extent of hydration of QCB can have a wide range of values, for example from about 1.4 up to about 2 moles of water per mole of Al, intercalated usually orderly or otherwise between the octahedral layers.

DTG (differential thermographimetry) indicates that the major amount of water is released from QCBs at a much lower temperature than from MCBs.

The XRD Patterns of QCBs show quite broad peaks and their half-widths (i.e. the widths of the peaks at half-maximum intensity) are indicative of the crystal sizes as well as degree of crystal perfection.

Some typical commercially available QCBs are Pural®, Catapal®, and Versal® products.

Microcrystalline boehmites are distinguished from the QCBs by their high degree of crystallinity, relatively large crystal size, very low surface areas, and high densities. Contrary to QCBs, MCBs show XRD patterns with higher peak intensities and very narrow half-widths. This is due to their relatively small number of intercalated water molecules, large crystal sizes, the higher degree of crystallization of the bulk material, and the smaller amount of crystal imperfections. Typically, the number of water molecules intercalated can vary in the range from about 1 up to about 1.4 per mole of Al.

A typical commercially available MCB is Condea's P-200®.

MCBs and QCBs are characterised by powder X-ray reflections. The ICDD contains entries for boehmite and confirms that reflections corresponding to the (020), (021), and (041) planes would be present. For copper radiation, such reflections would appear at 14, 28, and 38 degrees 2-theta. The exact position of the reflections depends on the extent of crystallinity and the amount of water intercalated: as the amount of intercalated water increases, the (020) reflection moves to lower values, corresponding to greater d-spacings. Nevertheless, lines close to the above positions would be indicative of the presence of one or more types of boehmite phases.

For the purpose of this specification we define quasi-crystalline boehmites as having a (020) reflection with a full width at half height (FWHH) of 1.5° or greater than 1.5° 2θ. Boehmites having a (020) reflection with a FWHH of smaller than 1.5° 2θ are considered micro-crystalline boehmites.

Overall, the basic, characteristic differences between QCBs and MCBs involve variations in the following: 3-dimensional lattice order, sizes of the crystallites, amount of water intercalated between the octahedral layers, and degree of crystal imperfections.

Zeolite

The zeolite used in the process according to the present invention preferably has a low sodium content (less than 1.5 wt % $Na_2O$), or is sodium-free. Suitable zeolites to be present in the slurry of step a) include zeolites such as Y-zeolites—including HY, USY, dealuminated Y, RE-Y, and RE-USY-zeolite beta, ZSM-5, phosphorus-activated ZSM-5, ion-exchanged ZSM-5, MCM-22, and MCM-36, metal-exchanged zeolites, ITQs, SAPOs, ALPOs, and mixtures thereof.

Clay

Also the clay is preferred to have a low sodium content (less than 0.1 wt % $Na_2O$), or to be sodium-free.

Suitable clays include kaolin, bentonite, saponite, sepiolite, attapulgite, laponite, hectorite, English clay, anionic clays such as hydrotalcite, and heat- or chemically treated clays such as meta-kaolin.

Step a)

The slurry of step a) is prepared by suspending clay, zeolite, the sodium-free silica source, non-peptised quasi-crystalline boehmite, and micro-crystalline boehmite in water. Optionally, other components may be added, such as aluminium chlorohydrol, aluminium nitrate, $Al_2O_3$, Al(OH)$_3$, anionic clays (e.g. hydrotalcite), smectites, sepiolite, barium titanate, calcium titanate, calcium-silicates, magnesium-silicates, magnesium titanate, mixed metal oxides, layered hydroxy salts, additional zeolites, magnesium oxide, bases or salts, and/or metal additives such as compounds containing an alkaline earth metal (for instance Mg, Ca, and Ba), a Group IIIA transition metal, a Group IVA transition metal (e.g. Ti, Zr), a Group VA transition metal (e.g. V, Nb), a Group VIA transition metal (e.g. Cr, Mo, W), a Group VIIA transition metal (e.g. Mn), a Group VIIIA transition metal (e.g. Fe, Co, Ni, Ru, Rh, Pd, Pt), a Group IB transition metal (e.g. Cu), a Group IIB transition metal (e.g. Zn), a lanthanide (e.g. La, Ce), or mixtures thereof.

The clay, zeolite, non-peptised QCB, MCB, sodium-free silicon source, and optional other components can be slurried by adding them to water as dry solids. Alternatively, slurries containing the individual materials are mixed to form the slurry according to step a). It is also possible to add some of the materials as slurries, and others as dry solids.

Any order of addition of these compounds may be used. It is also possible to combine these compounds all at the same time.

The slurry preferably comprises about 10 to about 70 wt %, more preferably about 15 to about 50 wt %, and most preferably about 15 to about 35 wt % of zeolite.

The slurry preferably comprises about 5 to about 70 wt %, more preferably about 10 to about 60 wt %, and most preferably about 10 to about 50 wt % of clay.

The slurry preferably comprises about 1 to about 50 wt %, more preferably about 2 to about 50 wt %, and most preferably about 5 to about 50 wt % of non-peptised QCB.

The slurry also comprises about 1 to about 50 wt %, more preferably about 1 to about 30 wt %, and most preferably about 1 to about 20 wt % of MCB.

The slurry further comprises about 1 to about 35 wt % and more preferably about 4 to about 18 wt % of sodium-free silicon source.

All weight percentages are based on dry solids content and calculated as oxides.

The solids content of the slurry preferably is 30 about 1 to about 30 wt %, more preferably 30 about 15 to about 30 wt %, and most preferably about 15 to about 25 wt %.

Step b)

In a next step, a monovalent acid is added to the suspension, causing digestion.

Both organic and inorganic monovalent acids can be used, or a mixture thereof. Examples of suitable monovalent acids are formic acid, acetic acid, propionic acid, nitric acid, and hydrochloric acid.

The acid is added to the slurry in an amount sufficient to obtain a pH lower than about 7, more preferably between about 2 and about 5, most preferably between about 3 and about 4.

During acid addition, the slurry may be stirred, milled, grinded, high-shear mixed, or treated with ultrasound waves.
Step c)

If the pH of the slurry of step b) is below about 3, the pH of the slurry is subsequently adjusted to a value above about 3, more preferably above about 3.5, even more preferably above about 4, and most preferably about 4.5 or higher. The pH of the slurry is preferably not higher than about 7, because slurries with a higher pH can be difficult to handle.

The pH can be adjusted by adding a base (e.g. NaOH or $NH_4OH$) to the slurry.

However, if after addition of the acid in step b) the pH is about 3 or higher, the pH may, but does not have to be raised in step c).

The time period between the pH adjustment and shaping step d) preferably is about 30 minutes or less, more preferably less than about 5 minutes, and most preferably less than about 3 minutes.
Step d)

Suitable shaping methods include spray-drying, pulse drying, pelletising, extrusion (optionally combined with kneading), beading, or any other conventional shaping method used in the catalyst and absorbent fields or combinations thereof. A preferred shaping method is spray-drying. If the catalyst is shaped by spray-drying, the inlet temperature of the spray-dryer preferably ranges from about 300 to about 600° C. and the outlet temperature preferably ranges from about 105 to about 200° C.

The catalyst so obtained has exceptionally good attrition resistance and accessibility. Therefore, the invention also relates to a catalyst obtainable by the process according to the invention.

The invention further relates to a catalyst comprising MCB, QCB, silica, zeolite, and clay. Preferably, such a catalyst comprises about 1 to about 50 wt %, more preferably about 3 to about 40 wt % of QCB, about 1 to about 25, more preferably about 5 to about 25 wt % of MCB, about 1 to about 25 wt % silica, about 5 to about 50 wt % zeolite, and balance clay (calculated as oxides).

These catalysts can be used as FCC catalysts, FCC additives—such as $SO_x$ reduction additives, $NO_x$ reduction additives, CO combustion additives, ZSM-5 additives, or sulphur in gasoline reduction additives—in hydroprocessing catalysts, alkylation catalysts, reforming catalysts, gas-to-liquid conversion catalysts, coal conversion catalysts, hydrogen manufacturing catalysts, and automotive catalysts. The invention therefore also relates to the use of these catalyst obtainable by the process of the invention as catalyst or additive in fluid catalytic cracking, hydroprocessing, alkylation, reforming, gas-to-liquid conversion, coal conversion, and hydrogen manufacturing, and as automotive catalyst.

EXAMPLES

Accessibility Measurement

The accessibility of the catalysts prepared according to the Examples below was measured by adding 1 g of the catalyst to a stirred vessel containing 50 g of a 15 g/l Kuwait vacuum gas oil (KVGO) in toluene solution. The solution was circulated between the vessel and a spectrophotometer, in which process the KVGO-concentration was continuously measured.

The accessibility of the catalysts to KVGO was quantified by the Akzo Accessibility Index (AAI). The relative concentration of KVGO in the solution was plotted against the square root of time. The AAI is defined as the initial slope of this graph:

$$AAI=-d(C_t/C_0)/d(t^{1/2})*100\%$$

In this equation, t is the time (in minutes) and $C_0$ and $C_t$ denote the concentrations of high-molecular weight compound in the solvent at the start of the experiment and at time t, respectively.

Attrition Resistance Measurement

The attrition resistance of the catalysts was measured by the standard Attrition Test. In this test the catalyst bed resides on an attrition plate with three nozzles. The attrition plate is situated within an attrition tube which is at ambient temperature. Air is forced to the nozzles and the resulting jets bring about upward transport of catalyst particles and generated fines. On top of the attrition tube is a separation chamber where the flow dissipates, and most particles larger than about 16 microns fall back into the attrition tube. Smaller particles are collected in a collection bag.

This test is conducted after calcination of the catalyst samples at 600° C., and it is first run for 5 hours and the weight percentage of fines collected in the collection bag, based on an imaginary intake of 50 grams, is determined. This is the initial attrition. The test is then conducted for another 15 hours and the weight percentage of fines in this time period (5-20 hours) is determined. This is the inherent attrition. The Attrition Index (AI) is the extrapolated wt % fines after 25 hours. So, the more attrition resistant the catalyst is, the lower the AI value.

Comparative Example 1

An aqueous slurry containing peptisable QCB (13.3 kg) was mixed with water and peptised by acidification with formic acid. The pH of the resulting mixture was 2. The mixture was stirred for 15 minutes. Next, MCB (highly crystalline alumina, 5 kg), zeolite Y slurry (8 kg), kaolin (4.17 kg), sodium-free silica sol (2.4 kg), and water were added and blended with the peptised QCB. The final pH of the slurry was 3.2. The slurry was then sent to a spray-dryer at 1 kg/min, inlet temperature 500° C., and outlet temperature 120° C.

The resulting material comprised 20 wt % zeolite, 24 wt % QCB, 14 wt % MCB, 6% $SiO_2$, and balance kaolin. The powder had a d50 around 65 μm.

The attrition index (AI), the accessibility index (AAI), and their ratio are indicated in the Table below.

Example 2

An aqueous slurry containing non-peptised but peptisable QCB (13.3 kg), MCB (highly crystalline alumina, 5.4 kg), a zeolite Y slurry (8 kg), kaolin (4.17 kg), sodium-free silica sol, and water were blended together. Nitric acid was then added to the total reaction mixture to reach pH 3.3. The slurry was then sent to a spray-dryer at 1 kg/min, inlet temperature 500° C., and outlet temperature 120° C.

The resulting material comprised 20 wt % zeolite, 24 wt % QCB, 14 wt % MCB, 6% $SiO_2$, and balance kaolin. The powder had a d50 around 65 μm.

The attrition index, the accessibility index, and their ratio are indicated in the Table below.

Comparative Example 3

An aqueous slurry containing peptisable QCB (16.6 kg) was mixed with water and peptised by acidification with formic acid. The pH of the resulting mixture was 2. The mixture was stirred for 15 minutes. Next, MCB (highly crystalline alumina, 5.4 kg), zeolite Y slurry (7.2 kg), kaolin (4.17 kg), sodium-free silica sol (2.4 kg), and water were added and blended with the peptised QCB. The final pH of the slurry was 3.2. The slurry was then sent to a spray-dryer at 1 kg/min, inlet temperature 500° C., and outlet temperature 120° C.

The resulting material comprised 18 wt % zeolite, 30 wt % QCB, 15 wt % MCB, 4% SiO$_2$, and balance kaolin. The powder had a d50 around 65 μm.

The attrition index, the accessibility index, and their ratio are indicated in the Table below.

Example 4

An aqueous slurry containing non-peptised but peptisable QCB (16.6 kg), MCB (highly crystalline alumina, 5.4 kg), a zeolite Y slurry (8 kg), kaolin (4.17 kg), sodium-free silica sol, and water were blended together. Nitric acid was then added to the total reaction mixture to reach pH 3.2. The slurry was then sent to a spray-dryer at 1 kg/min, inlet temperature 500° C., and outlet temperature 120° C.

The resulting material comprised 18 wt % zeolite, 30 wt % QCB, 15 wt % MCB, 4% SiO$_2$, and balance kaolin. The powder had a d50 around 65 μm.

The attrition index, the accessibility index, and their ratio are indicated in the Table below.

Comparative Example 5

An aqueous slurry containing peptisable QCB (16.6 kg) was mixed with water and peptised by acidification with formic acid. The pH of the resulting mixture was 2. The mixture was stirred for 15 minutes. Next, MCB (highly crystalline alumina, 5.4 kg), zeolite Y slurry (9.6 kg), kaolin (4.17 kg), sodium-free silica sol (2.4 kg), and water were added and blended with the peptised QCB. The final pH of the slurry was 3.2. The slurry was then sent to a spray-dryer at 1 kg/min, inlet temperature 500° C., and outlet temperature 120° C.

The resulting material comprised 24 wt % zeolite, 30 wt % QCB, 15 wt % MCB, 4% SiO$_2$, and balance kaolin. The powder had a d50 around 65 μm.

The attrition index, the accessibility index, and their ratio are indicated in the Table below.

Example 6

An aqueous slurry containing non-peptised but peptisable QCB (16.6 kg), MCB (highly crystalline alumina, 5.4 kg), a zeolite Y slurry (9.6 kg), kaolin (4.17 kg), sodium-free silica sol, and water were blended together. Nitric acid was then added to the total reaction mixture to reach pH 3.3. The slurry was then sent to a spray dryer at 1 kg/min, inlet temperature 500° C., and outlet temperature 120° C.

The resulting material comprised 24 wt % zeolite, 30 wt % QCB, 15 wt % MCB, 4% SiO$_2$, and balance kaolin. The powder had a d50 around 65 μm.

The attrition index, the accessibility index, and their ratio are indicated in the Table below.

TABLE

| Example | AI | AAI | AAI/AI |
|---|---|---|---|
| 1 (comparative) | 18 | 15 | 0.8 |
| 2 | 8.1 | 12 | 1.5 |
| 3 (comparative) | 15.8 | 14 | 0.9 |
| 4 | 6.8 | 11 | 1.6 |
| 5 (comparative) | 20.2 | 18 | 0.9 |
| 6 | 9.5 | 14 | 1.5 |

This Table shows that the process of the present invention results in more attrition resistant catalysts (reduced AI) and a higher AAI/AI ratio compared to a process which uses pre-peptised boehmite.

The invention claimed is:

1. A process for the preparation of a catalyst comprising the steps of:
    a) preparing a slurry comprising clay, zeolite, a sodium-free silica source, quasi-crystalline boehmite, and micro-crystalline boehmite, provided that the slurry does not comprise peptised quasi-crystalline boehmite,
    b) adding a monovalent acid to the slurry,
    c) adjusting the pH of the slurry to a value above 3, and
    d) shaping the slurry to form particles;
        wherein the slurry contains 1 to 50 wt % of quasi-crystalline boehmite, and 1 to 50 wt % of micro-crystalline boehmite, wherein the weight percentages are based on dry solids content and calculated as oxides.

2. The process according to claim 1 wherein the sodium-free silica source is selected from the group consisting are sodium-free silica sol, polysilicic acid, potassium silicate, lithium silicate, calcium silicate, magnesium silicate, barium silicate, strontium silicate, zinc silicate, phosphorus silicate, and borium silicate, polyorganosiloxanes, methyl chlorosilane, dimethyl chlorosilane, trimethyl chlorosilane, and mixtures thereof.

3. The process according to claim 1 wherein the pH in step c) is adjusted to a value of between 4 and 7.

4. A catalyst composition comprising clay, zeolite, a sodium-free silica source, quasi and micro-crystalline boehmite, wherein the composition is prepared by a) preparing a slurry comprising clay, zeolite, a sodium-free silica source, quasi-crystalline boehmite, and micro-crystalline boehmite, provided that the slurry does not comprise peptised quasi-crystalline boehmite; b) adding a monovalent acid to the slurry; c) adjusting the pH of the slurry to a value above about 3, and d) shaping the slurry to form particles; wherein the slurry contains 1 to 50 wt % of quasi-crystalline boehmite, and 1 to 50 wt % of micro-crystalline boehmite, wherein the weight percentages are based on dry solids content and calculated as oxides.

5. A catalyst composition comprising micro-crystalline boehmite, quasi-crystalline boehmite, zeolite, and silica, wherein the composition contains 1 to 50 wt % of quasi-crystalline boehmite, and 1 to 25 wt % of micro-crystalline boehmite, wherein the weight percentages are calculated as oxides.

6. The process according to claim 1 wherein the zeolite is selected from the group consisting of Y-zeolite, ZSM-5, phosphorus-activated ZSM-5, ion-exchanged ZSM-5, MCM-22, and MCM-36, metal-exchanged zeolites, ITQs, SAPOs, ALPOs, and mixtures thereof.

7. The process according to claim 1 wherein the zeolite has a sodium content of less than 1.5 wt % Na$_2$O.

* * * * *